United States Patent [19]

Babcock

[11] Patent Number: 4,808,015
[45] Date of Patent: Feb. 28, 1989

[54] CLUTCH RELEASE BEARING ASSEMBLY INCLUDING A DOUBLE-ACTING SLIDING BORE SLEEVE

[75] Inventor: Bryce W. Babcock, Saline, Mich.

[73] Assignee: Federal-Mogul Corporation, Southfield, Mich.

[21] Appl. No.: 106,509

[22] Filed: Oct. 6, 1987

[51] Int. Cl.[4] .......... F16C 19/10; F16C 21/00; F16C 31/00; F16D 19/00

[52] U.S. Cl. .................. 384/609; 192/98; 192/110 B; 384/42; 384/126; 384/616; 384/901; 403/365

[58] Field of Search ............ 384/7, 26, 29–32, 384/35, 42, 46, 126, 590, 609, 612, 615–617, 624, 901, 490, 557, 581, 582, 584, 585, 493, 513, 535–537; 464/146, 162, 179, 182; 192/98, 110 B; 403/365, 372

[56] References Cited

U.S. PATENT DOCUMENTS

| 1,132,759 | 3/1915 | Bache . | |
|---|---|---|---|
| 1,184,614 | 5/1916 | Brightman | 384/42 |
| 1,552,054 | 9/1925 | Green . | |
| 1,674,453 | 6/1928 | Sloper . | |
| 2,675,283 | 4/1954 | Thomson . | |
| 2,803,224 | 8/1957 | Wilson . | |
| 2,889,180 | 6/1959 | Jorgensen . | |
| 2,976,093 | 3/1961 | Reiling . | |
| 3,033,623 | 5/1962 | Thomson . | |
| 3,056,637 | 10/1962 | Shanley et al. . | |
| 3,320,003 | 5/1967 | Edelson et al. . | |
| 3,428,369 | 2/1969 | Kowack . | |
| 3,438,686 | 4/1969 | Stone . | |
| 3,620,579 | 11/1971 | Brown et al. . | |
| 3,887,155 | 6/1975 | Bertalot . | |
| 3,955,861 | 5/1976 | Orain | 384/490 X |
| 4,080,019 | 3/1978 | Flaissier et al. . | |
| 4,117,916 | 10/1978 | Baker | 192/98 |
| 4,142,618 | 3/1979 | Fontaine et al. | 192/98 |
| 4,243,130 | 1/1981 | Vinel et al. | 192/98 |
| 4,261,625 | 4/1981 | Renaud | 192/98 X |
| 4,351,427 | 9/1982 | Miyahara | 192/98 |
| 4,371,068 | 2/1983 | Billet | 192/98 |
| 4,403,685 | 9/1983 | Beccaris | 192/98 |
| 4,434,882 | 3/1984 | Olschewski et al. | 192/98 |
| 4,437,556 | 3/1984 | Brandenstein et al. | 192/98 |
| 4,466,527 | 8/1984 | Billet | 192/98 |
| 4,478,325 | 10/1984 | Dagiel | 192/98 |
| 4,509,870 | 4/1985 | Taki | 384/296 |
| 4,519,488 | 5/1985 | Renaud | 192/98 |
| 4,529,076 | 6/1985 | Renaud | 192/98 |
| 4,537,294 | 8/1985 | Renaud | 192/98 |
| 4,555,190 | 11/1985 | Lederman | 384/495 |
| 4,561,788 | 12/1985 | Tanaka | 384/513 |
| 4,567,976 | 2/1986 | Brandenstein et al. | 192/98 |
| 4,576,268 | 3/1986 | Brandenstein et al. | 192/98 |
| 4,579,211 | 4/1986 | Renaud | 192/98 |
| 4,601,522 | 6/1986 | Rock | 384/19 |
| 4,605,113 | 8/1986 | Brandenstein et al. | 192/98 |
| 4,637,506 | 1/1987 | Billet | 192/110 B |
| 4,643,286 | 2/1987 | Lassiaz | 192/98 |
| 4,653,626 | 3/1987 | Limbacher | 192/98 |

FOREIGN PATENT DOCUMENTS

| 930283 | 7/1963 | United Kingdom | 384/901 |
|---|---|---|---|
| 2045380 | 10/1980 | United Kingdom | 192/98 |

*Primary Examiner*—Daniel P. Stodola
*Assistant Examiner*—Thomas R. Hannon
*Attorney, Agent, or Firm*—Robert F. Hess; Lawrence J. Shurupoff

[57] ABSTRACT

An improved clutch release bearing assembly includes a sliding sleeve providing first and second sliding surfaces respectively facing the bore of a bearing and a guide element extending through the bore, both surfaces minimizing binding, wear or excessive friction between the bearing and the guide element during relative reciprocal motion therebetween. The sleeve, preferably fashioned from plastic, finds particular utility in a clutch release bearing surrounding a transmission shaft retainer or quill tube. The length of the sleeve is such that the bearing may slide on an outer sliding surface for a predetermined distance.

7 Claims, 2 Drawing Sheets

CLUTCH RELEASE BEARING ASSEMBLY INCLUDING A DOUBLE-ACTING SLIDING BORE SLEEVE

BACKGROUND OF THE INVENTION

The invention relates generally to apparatus providing sliding surfaces enabling reciprocal movement between elements with low binding, wear and friction-forces. More specifically, the invention concerns intermediate sleeves for use between bearings, such as clutch release bearings, and a guide element extending through a bore in the bearing.

Requirements for increased fuel efficiency have prompted the transportation manufacturing industry to make increased use of lighter weight material such as aluminum in various parts of the vehicles being produced. Unfortunately, aluminum wears more readily than the cast iron or steel material that typically is replaced in various applications, and hence provision must be made in certain applications to minimize such wear. One particular application requiring such additional wear preventive measures is found where a conventional clutch release bearing having a steel bore now rides on a guide tube or quill made of aluminum. In such an application, one known approach to alleviating excessive binding, wear or excessive friction between the bore of the clutch release bearing and its aluminum guide tube is to place a sleeve having a low coefficient of friction in the bearing bore such that the sleeve on its inner surface will make sliding contact with the guide tube. Such sleeves are typically fashioned of a synthetic resin or plastic material and are often an integral part of the bearing carrier. Such known approaches, however, have been found to provide only a moderate degree of wear protection, in that, after a number of operating cycles, aluminum particles from the guide tube often become embedded in the plastic sleeve leading to aluminum particles sliding on the aluminum guide tube which, in turn, creates heavy friction forces and wear. Such friction increase may, in turn, lead to undesirable increases in the "pedal effort" needed to release the clutch in a manual transmission system.

None of the known art teaches, claims, or even suggests a sleeve having two sliding surfaces, either of which may be used to facilitate reciprocating movement between a bearing and its associated guide element.

SUMMARY OF THE INVENTION

Accordingly, it is an object of the invention to provide an intermediate sleeve having two compatible sliding surfaces for enabling relatively facile linear or translational movement of a bearing, such as a clutch release bearing, upon a guide element, such as a quill or transmission retainer shaft.

Prusuant to the invention, a sleeve of preferably plastic material is inserted between the surface of the bearing bore and an outer surface of a guide element extending through that bore, the sleeve having a first sliding surface engageable with the bore surface and a second sliding surface engageable with an outer surface of the guide element. Additionally, the sleeve is provided with a length ideally sufficient to enable the bearing to reciprocate along the first sliding surface of the sleeve for a predetermined distance equal to the bearing travel required to effect disengagement of the clutch.

It is a feature of the invention to provide a clutch release bearing in which friction forces causing wear, chatter, high-bearing carrier loads and increased clutch pedal effort are reduced.

It is a further feature of the invention that the general operability of the clutch system incorporating the invention is improved.

It is still a further feature of the invention that its use may be implemented with minimal design changes and added cost attendant to such changes for a conventional clutch release bearing system.

BRIEF DESCRIPTION OF THE DRAWING

These and other objects and features of the invention will become apparent from a reading of a detailed description taken in conjunction with the drawing in which.

DETAILED DESCRIPTION

Figure 1:
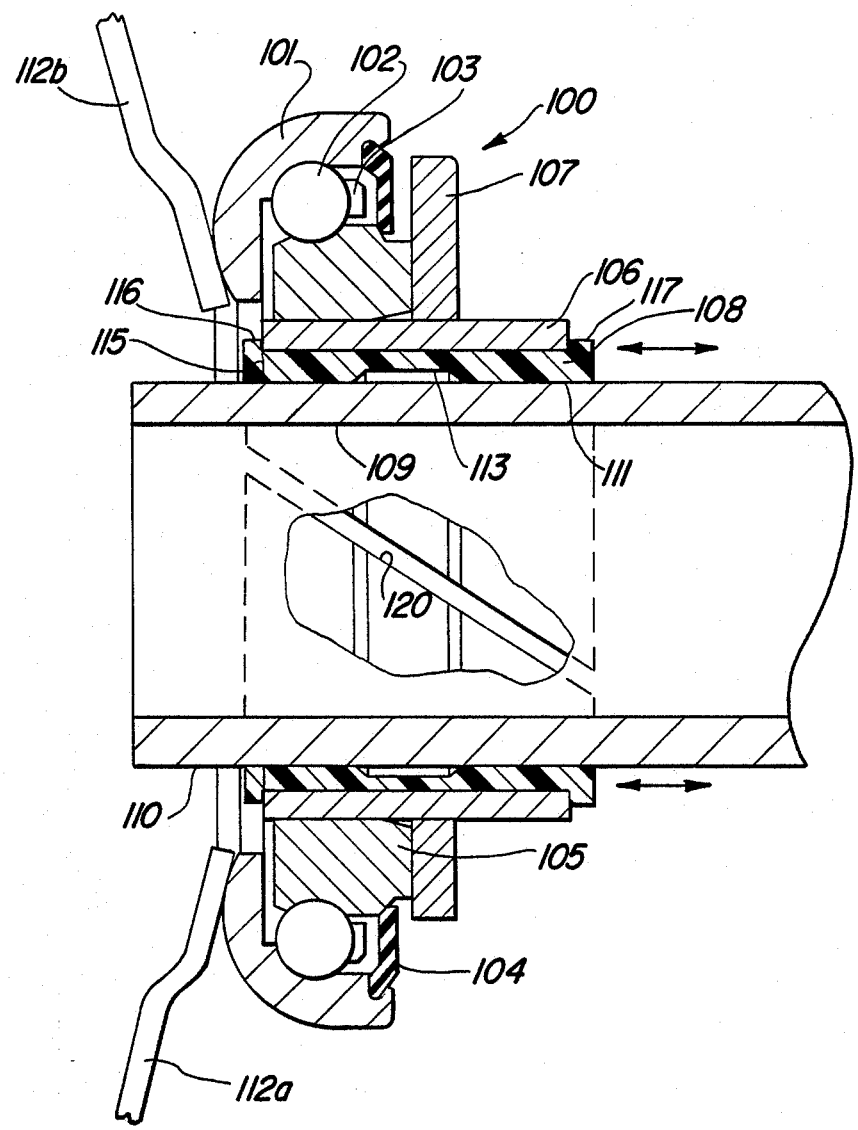
FIG. 1 is a cross-sectional view of a prior art arrangement for a clutch release bearing surrounding an aluminum retainer shaft or guide tube.

FIG. 1 sets forth an arrangement of a prior approach to attempt to minimize friction and wear between the clutch release bearing assembly 100 and an aluminum transmission retainer shaft or quill 109. As seen from FIG. 1, release bearing 100 includes a ball bearing assembly having an outer ball bearing race 101 and an inner race 105, the inner and outer races defining a space for a plurality of ball members 102. The ball members 102 are retained by a retaining cage 103 and the raceway is closed at one end by a typical bearing seal 104.

The outer race member 101 has a forwardly facing surface which bears against the pressure plate fingers of a clutch mechanism (not shown), two of the pressure plate fingers being partially shown at 112a and 112b. A carrier assembly for the release bearing comprises a cylindrical carrier member 106 defining a bore in the bearing through which the aluminum retainer shaft 109 is to extend. The carrier assembly also includes a thrust flange 107 which bears against inner race member 105 and is acted upon by a clutch fork (not shown) to axially slide the bearing assembly 100 into engagement with clutch fingers 112a, b as shown. Both the inner race member 105 and trust flange 107 are press fit or otherwise fixedly secured to the carrier member 106. Positioned between an inner surface of the carrier member 106 and a sliding surface 110 on the aluminum retainer shaft 109 is a plastic sleeve 108. Sleeve 108 includes a lubricant reservoir 113 and a flange at each end of the sleeve, designated 116 and 117, respectively. Flanges 116 and 117 are positioned to abut respective ends of the cylindrical carrier member 106 such that the plastic sleeve 108 will move with the release bearing and will slide on sliding surface 110 of the retainer shaft. Sleeve 108 additionally includes a diagonal split or slit 120 which enables the diameter of the sleeve 108 to be temporarily decreased for ease of insertion of the sleeve 108 into the bearing bore of the carrier 106.

With the arrangement set forth in FIG. 1, it has been found that after several thousand cycles of operation particles from the retainer shaft 109 may become embedded in the inner surface 111 of sleeve 108, thereby leading to aluminum-upon-aluminum rubbing contact which in turn increases the friction force, in turn increasing the pedal effort required to move a release bearing longitudinally of the aluminum retainer shaft 109.

As the friction forces increase due to the above condition, the plastic sleeve becomes prone to fracture at the area where a flange 116 or 117 joins the main body of the sleeve, one such potential fracture line being shown at 115 in FIG. 1.

Figure 2:
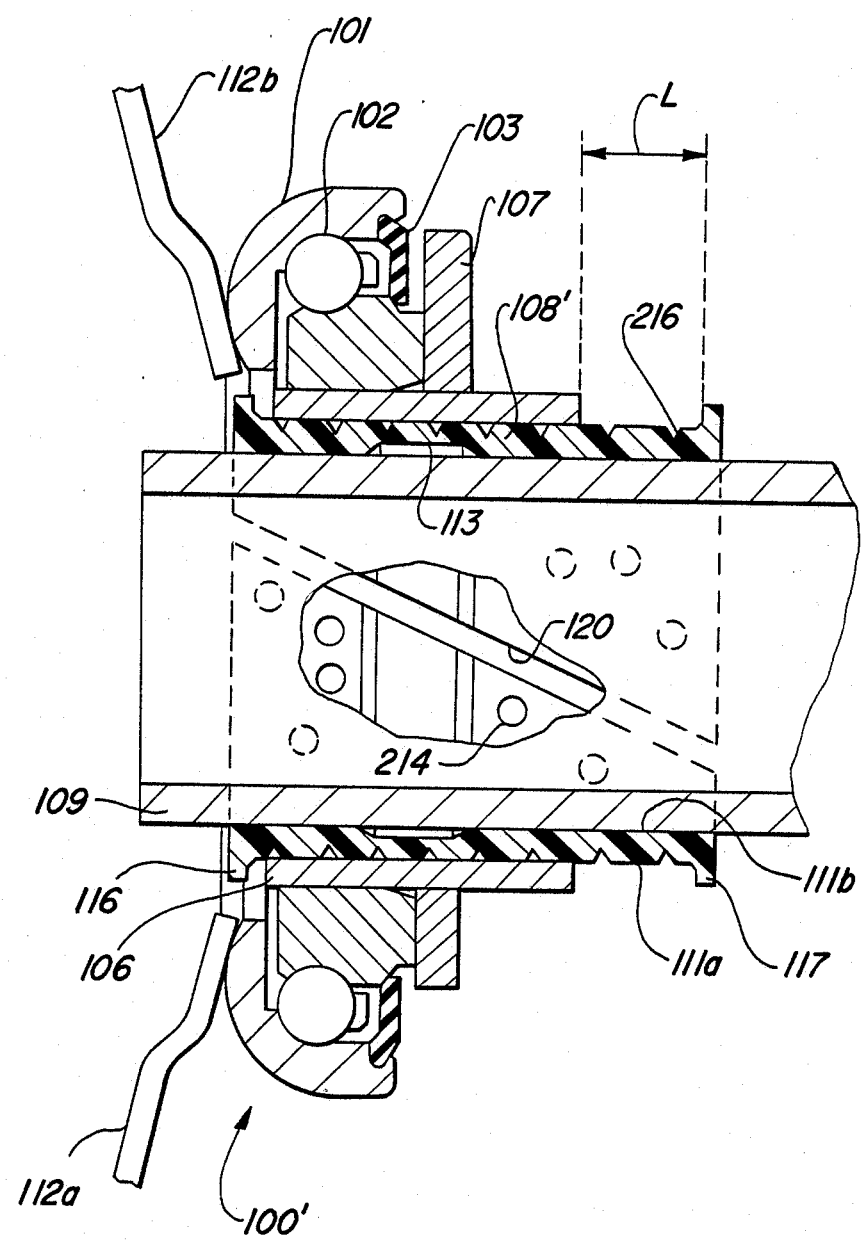
FIG. 2 is a cross-sectional view of a clutch release bearing provided with a double-acting intermediate sleeve arranged in accordance with the principles of the invention.

An example of the improvement afforded by use of the principles of the invention is set forth in the cross-sectional view of a clutch release bearing of FIG. 2. The clutch-release bearing assembly 100' is or may be identical in structure and function, excepting slider sleeve 108', to that set forth in FIG. 1. Hence, like reference numerals for apparatus identical to that of FIG. 1 are used throughout FIG. 2.

With reference to FIG. 2, the improvement comprises a slider sleeve 108' wherein it will be noted that the length of the sleeve 108' between flanges 116 and 117, comprising first and second sliding surfaces 111b and 111a, respectively, is greater than the length of the bore defined in the bearing carrier 106. This increase in length, L, is equal to the required stroke of the clutch release bearing. In this manner, the bearing may slide on outer sliding surface 111a of sleeve 108' for disengaging the clutch, even though increased frictional forces betwen the aluminum retainer shaft or quill 109 and inner surface 111b of the sleeve 108' make difficult or even prevent relative axial movement between such surfaces. Damage to flanges 116 and 117 of sleeve 108' is also precluded.

With the arrangement as shown, the double acting sliding bore sleeve 108' functions in the following manner. The sleeve 108' is press-fit into the bore of the bearing carrier 106 by use of the diagonal slit 120 to momentarily decrease the outer diameter of the sleeve for insertion through the carrier bore. It is intended that, during normal operation, either the bearing 100' will slide back and forth on the sliding surface 111a on the outer diameter of the sleeve 108', on sliding surface 111b, or on both sliding surfaces 111a and 111b. Typically, it is expected that due to the initial press-fit of the sleeve 108' into the bore of carrier 106, the release bearing 100' and the slider sleeve 108' will move as a unit along the retainer shaft or quill 109 for the entire stroke length L, thereby initially utilizing only sliding surface 111b on the inner diameter of the sleeve 108'. As particles from the retainer shaft or quill 109 become embedded on the inner surface 111b of the sleeve 108' (as with the prior art arrangements) the sleeve 108' will begin to resist sliding motion relative to the retainer shaft, and its outer surface 111a will then be used as the sliding surface between the bearing carrier 106 and the sleeve 108', whereby the bearing can freely move reciprocally relative to the retainer shaft. Typically, the carrier 106 is of mild or relatively high carbon steel and hence exhibits high wear resistance. Consequently, the problems of metal embedment associated with the aluminum quill 109 do not present themselves, and long operating life is assured. In this manner, it will be seen that the sleeve 108' will greatly increase the number of cycles of operation, notably beyond the expected operational life of the clutch itself.

The length of the sleeve 108', while ideally being long enough to enable a full bearing stroke along outer surface 111a, in some applications may be required to be limited such that the sleeve 108' will not project over the end of the retainer shaft and contact the face of the clutch friction disc.

An additional advantage offered by the arrangement set forth in FIG. 2 is that when the clutch disc wears and the clutch bearing is pushed further back on the retainer shaft or quill 109, the sleeve 108' will slide as far down the retainer shaft as is required to maintain proper reciprocating operation.

The outer diameter of the sleeve 108' should be small enough to allow sliding of the bearing carrier thereon, but large enough to provide adequate guidance and support for the bearing assemby.

Additionally, sleeve 108' may carry a plurality of dimples 216 on its outer surface 111a and a further plurality of dimples 214 on its inner surface 111b, the dimples being provided for retention of lubricants such as grease to futher minimize sliding friction.

Preferable materials for sleeve 108' are Nylon and Delrin.

The invention has been described with reference to a description of a preferred embodiment, the details of which are given for the sake of example only. The invention is to be defined in scope and spirit by the appended claims.

What is claimed is:

1. In a clutch release bearing having a bore surrounding a guide tube for reciprocating movement between the bearing and the guide tube, the improvement comprising:

a slider sleeve positioned between the bearing bore and an outer surface of the guide tube, the sleeve having a first sliding surface facing a surface of the bore and a second sliding surface facing an outer surface of the guide tube, the first and second sliding surfaces comprising a material exhibiting higher resistance to wear and friction than that of at least one of the bore surface and the outer surface of the guide tube, and the sleeve having a length sufficient to enable the clutch release bearing to reciprocate along the first sliding surface of the sleeve for a predetermined clutch release bearing stroke distance enabling proper operation of a clutch system associated with the bearing.

2. The improvement of claim 1 further comprising means for retaining the slider sleeve in the bearing bore.

3. The improvement of claim 2 wherein the means for retaining comprises first and second flanges extending outwardly of the first sliding surface.

4. The improvement of claim 3 wherein the sleeve comprises a substantially cylindrical plastic tube.

5. The improvement of claim 4 wherein the plastic tube includes a slit extending at least from a first end of the tube in a manner enabling relatively facile insertion of the tube into the bearing bore.

6. The improvement of claim 5 wherein the slider sleeve further includes an annular cavity in the second sliding surface serving as a lubricant reservoir.

7. The improvement of claim 6 wherein the slider sleeve further includes depressions in both the first and second sliding surfaces for receipt of lubricant.

* * * * *